United States Patent
Koyanagi et al.

(10) Patent No.: US 6,538,194 B1
(45) Date of Patent: Mar. 25, 2003

(54) PHOTOELECTRIC CELL AND PROCESS FOR PRODUCING METAL OXIDE SEMICONDUCTOR FILM FOR USE IN PHOTOELECTRIC CELL

(75) Inventors: Tsuguo Koyanagi, Kitakyushu (JP); Michio Komatsu, Kitakyushu (JP); Hirokazu Tanaka, Kitakyushu (JP); Katsuhiro Shirono, Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 09/701,347

(22) PCT Filed: May 28, 1999

(86) PCT No.: PCT/JP99/02837

§ 371 (c)(1),
(2), (4) Date: Nov. 28, 2000

(87) PCT Pub. No.: WO99/63614

PCT Pub. Date: Dec. 9, 1999

(30) Foreign Application Priority Data

May 29, 1998 (JP) .......................................... 10-149550
Aug. 31, 1998 (JP) .......................................... 10-245935

(51) Int. Cl.[7] ..................... H01M 14/00; C01G 23/053; H01L 31/04

(52) U.S. Cl. ................ 136/256; 136/252; 136/263; 136/265; 429/111; 257/43; 257/431; 257/433; 106/286.4; 106/287.19; 427/74; 427/372.2; 427/529; 427/595

(58) Field of Search .................. 136/252, 256, 136/263, 265; 429/111; 257/43, 431, 433; 106/286.4, 287.19; 427/74, 372.2, 529, 595; 438/85

(56) References Cited

U.S. PATENT DOCUMENTS

| | | | | |
|---|---|---|---|---|
| 4,385,102 A | * | 5/1983 | Fitzky et al. | 429/111 |
| 4,927,721 A | | 5/1990 | Gratzel et al. | 429/111 |
| 5,084,365 A | | 1/1992 | Gratzel et al. | 429/111 |
| 5,350,644 A | * | 9/1994 | Graetzel et al. | 429/111 |
| 5,525,440 A | | 6/1996 | Kay et al. | 429/111 |
| 6,075,203 A | * | 6/2000 | Wang et al. | 136/256 |
| 6,107,241 A | * | 8/2000 | Ogata et al. | 505/350 |

FOREIGN PATENT DOCUMENTS

| | | | |
|---|---|---|---|
| EP | 693800 A2 | * | 1/1996 |
| JP | 1-220380 | | 9/1989 |
| JP | 6-511113 | | 8/1994 |
| JP | 8-015097 | | 1/1996 |
| JP | 10-67516 A | * | 3/1998 |
| WO | WO/9736677 A1 | * | 10/1997 |

* cited by examiner

*Primary Examiner*—Alan Diamond
(74) *Attorney, Agent, or Firm*—Webb Ziesenheim Logsdon Orkin & Hanson, P.C.

(57) ABSTRACT

A photoelectric cell that includes a first insulating base, having on its surface a first electrode layer, which has on its surface a metal oxide semiconductor film, which includes anatase titanium oxide particles, on which a photosensitizer is adsorbed and a second insulating base having on its surface a second electrode layer and an electrolyte sealed between the metal oxide semiconductor film and the second electrode layer. The first electrode layer and the second electrode layer are arranged opposite from each other. At least one of the first and second insulating bases with an electrode layer is transparent.

14 Claims, 3 Drawing Sheets

PHOTOELECTRIC CELL AND PROCESS FOR PRODUCING METAL OXIDE SEMICONDUCTOR FILM FOR USE IN PHOTOELECTRIC CELL

BACKGROUND OF THE INVENTION

The present invention relates to a photoelectric cell, a coating liquid for forming a metal oxide semiconductor film for use in a photoelectric cell and a process for producing a metal oxide semiconductor film for use in a photoelectric cell. More particularly, the present invention is concerned with a photoelectric cell wherein the adsorption and carrying amounts of photosensitizer on a metal oxide semiconductor film are large and the strength of bonding of the photosensitizer to the metal oxide semiconductor film is large with the result that the photoelectric cell exhibits enhanced photoelectric transfer efficiency. Further, the present invention is concerned with a coating liquid for forming a metal oxide semiconductor film for use in such a photoelectric cell and a process for producing a metal oxide semiconductor film for use in such a photoelectric cell.

A photoelectric transfer material is a material from which light energy is continuously taken out as electric energy and a material which converts light energy to electric energy by the utilization of electrochemical reaction between electrodes. When the photoelectric transfer material is irradiated with light, electrons are generated from one electrode. The electrons move to a counter electrode, and the electrons having reached the counter electrode return by moving as ions through an electrolyte to the one electrode. This energy conversion is continuously carried out, so that it is utilized in, for example, a solar cell.

The common solar cell consists of an electrode formed by coating the surface of a support such as glass plate with transfer conductive film, wherein semiconductor for photoelectric transfer material is formed on the transfer conductive film, a counter electrode formed by coating the surface of a support such as a glass plate with another transparent conductive film, and an electrolyte sealed between these electrodes.

When this solar cell is irradiated with sunlight, the photosensitizer incorporated therein absorbs visible radiation region to thereby excite the electrons of photosensitizer dye. The excited electrons move to the semiconductor for photoelectric transfer material, and then the transparent conductive glass electrode, further move to the counter electrode. The electrons having reached the counter electrode reduce the oxidation-reduction system present in the electrolyte. On the other hand, the photosensitizer having caused electrons to move to the semiconductor becomes oxidized form. This oxidized form is reduced by the oxidation-reduction system (which becomes reduced form) of the electrolyte to thereby return to the original form. In this manner, electrons continuously flow. Therefore, functioning as the solar cell comprising the semiconductor for photoelectric transfer material can be realized by virtue of the continuous flow of electrons.

A semiconductor having a surface on which a photosensitizer exhibiting absorption in visible radiation region is adsorbed is used as such a photoelectric transfer material. For example, Japanese Patent Laid-open Publication No. 1(1989)-220380 describes a solar cell comprising a metal oxide semiconductor and, superimposed on a surface thereof, a layer of a photosensitizer such as a transition metal complex. Further, Published Japanese Translation of PCT Patent Applications from Other States, No. 5(1993)-504023 describes a solar cell comprising a titanium oxide semiconductor layer doped with metal ions and, superimposed on a surface thereof, a layer of a photosensitizer such as a transition metal complex.

In these solar cells, for increasing the photoelectric transfer efficiency, it is important that the move of electrons from the photosensitizer layer having absorbed light and having been excited to a titania film be performed rapidly. When the move of electrons is not performed rapidly, the electrons recombine with the transition metal complex such as a ruthenium complex to thereby invite the problem of causing a drop of photoelectric transfer efficiency. Therefore, studies, such as on the improvement of the condition of bonding of the photosensitizer to the titania film surface and the improvement of electron mobility within the titania film, are performed.

For improving the condition of bonding of the photosensitizer to the titania film surface, for example, it has been proposed to, at the time of forming a metal oxide semiconductor film, repeat the operations of application of titania sol to a base, drying and annealing to thereby form a porous thick film, thus rendering the semiconductor film porous, with the result that the amount of Ru complex carried on the surface is increased. Further, it has been proposed to carry out an annealing at 400° C. or higher to thereby sinter fine particles of titania with the result that a conductivity enhancement is realized. Still further, in Published Japanese Translation of PCT Patent Applications from Other States, No. 6(1994)-511113, it is carried out in order to increase the effective surface of the semiconductor to, after the formation of a semiconductor layer composed of a porous titanium oxide, immerse the semiconductor layer in an aqueous solution of titanium chloride, or to electrochemically deposit titanium oxide on the porous titanium oxide semiconductor layer with the use of a solution of titanium chloride hydrolyzate.

However, in the current state of the art, there are problems, for example, when annealing is effected for increasing the electron mobility, sintering occurs to thereby decrease the porosity (effective surface) with the result that the adsorption amount of photosensitizer is lowered. Moreover, because the photoelectric transfer efficiency is not satisfactory, the use thereof is limited. Therefore, there is a demand for further improvement of the solar cells.

An object of the present invention is to provide a photoelectric cell wherein the adsorption proportion of photosensitizer is high, the reactivity of photosensitizer is high, electron, movement is smooth within the semiconductor and, hence, the photoelectric transfer efficiency is enhanced. Another object of the present invention is to provide a coating liquid for forming a metal oxide semiconductor film for use in such a photoelectric cell. A further object of the present invention is to provide a process for producing a metal oxide semiconductor film for use in such a photoelectric cell.

SUMMARY OF THE INVENTION

A photoelectric cell of the present invention (hereinafter referred to as "the first photoelectric cell") comprises:
an insulating base having on its surface an electrode layer (1), the electrode layer (1) having on its surface a metal oxide semiconductor film (2) on which a photosensitizer is adsorbed;
an insulating base having on its surface an electrode layer (3), the electrode layer (1) and the electrode layer (3) arranged opposite to each other; and an electrolyte sealed between the metal oxide semiconductor film (2) and the electrode layer (3), wherein:
at least one of the electrode-having insulating bases is transparent; and
the metal oxide semiconductor film (2) comprises anatase titanium oxide particles.

It is preferred that the anatase titanium oxide particles have a crystallite diameter ranging from 5 to 50 nm. It is also preferred that the anatase titanium oxide particles be colloid particles having an average particle diameter ranging from 5 to 600 nm. These anatase titanium oxide particles are preferably those obtained by subjecting peroxotitanic acid to heating and aging.

Another form of photoelectric cell of the present invention (hereinafter referred to as "the second photoelectric cell") comprises:

an insulating base having on its surface an electrode layer (1), the electrode layer (1) having on its surface a metal oxide semiconductor layer (2) on which a photosensitizer is adsorbed;

an insulating base having on its surface an electrode layer (3), the electrode layer (1) and the electrode layer (3) arranged opposite to each other; and an electrolyte sealed between the metal oxide semiconductor layer (2) and the electrode layer (3), wherein:
conductive protrusions (4) jutting from the surface of the electrode layer (1) exist, the metal oxide semiconductor layer (2) formed so as to cover the conductive protrusions (4) and the electrode layer (1), and
at least one of the electrode-layer-having insulating bases is transparent.

It is preferred that the metal oxide semiconductor layer be formed along a contour of the conductive protrusions (4). It is also preferred that the metal oxide semiconductor layer comprise spherical particles of at least one of metal oxides selected from the group consisting of titanium oxide, lanthanum oxide, zirconium oxide, niobium oxide, tungsten oxide, strontium oxide, zinc oxide, tin oxide and indium oxide. These spherical particles preferably have an average particle diameter ranging from 5 to 600 nm.

In particular, the spherical particles are preferably those composed of anatase titanium oxide or those having a core-shell structure comprising a core particle of 0.1 to 500 nm in average particle diameter having its surface covered with a shell. It is preferred that the shell of the spherical particles of the core-shell structure be composed of anatase titanium oxide. This anatase titanium oxide is preferably one obtained by subjecting peroxotitanic acid to heating and aging as mentioned above.

The metal oxide semiconductor layer of each of the first photoelectric cell and second photoelectric cell according to the present invention preferably contains a titanium oxide binder. This metal oxide semiconductor layer is preferably one obtained by implanting ions of at least one gas selected from the group consisting of $O_2$, $N_2$, $H_2$ and inert gases of Group 0 of the periodic table and thereafter annealing. Further, it is preferred that the metal oxide semiconductor layer have a pore volume of 0.05 to 0.8 ml/g and an average pore diameter of 2 to 250 nm.

The coating liquid for forming a metal oxide semiconductor film for use in a photoelectric cell according to the present invention comprises peroxotitanic acid, anatase titanium oxide particles and a dispersion medium. The anatase titanium oxide particles are preferably those obtained by subjecting peroxotitanic acid to heating and aging.

The process for producing a metal oxide semiconductor film for use in a photoelectric cell according to the present invention comprises applying the above coating liquid for forming a metal oxide semiconductor film for use in a photoelectric cell to thereby obtain a coating film and hardening the coating film. In this process for producing a metal oxide semiconductor film for use in a photoelectric cell, the hardening of the coating film is preferably performed by irradiating the coating film with ultraviolet light. The coating film, after the hardening by ultraviolet light irradiation, may be subjected to implantation of ions of at least one gas selected from the group consisting of $O_2$, $N_2$, $H_2$ and inert gases of Group 0 of the periodic table and thereafter annealing.

DESCRIPTION OF SIGN CHARACTER

1: electrode layer,
2: metal oxide semiconductor film,
3: transparent electrode layer,
4: electrolyte,
5: insulating base,
6: transparent insulating base,
11: electrode layer,
12: metal oxide semiconductor layer,
13: transparent electrode layer,
14: conductive protrusions,
15: electrolyte,
16: insulating base, and
17: transparent insulating base.

DETAILED DESCRIPTION OF THE INVENTION

The present invention will now be described in detail.

First Photoelectric Cell

The first photoelectric (photovoltaic) cell of the present invention comprises:

an insulating base having on its surface an electrode layer (1), the electrode layer (1) having on its surface a metal oxide semiconductor film (2) on which a photosensitizer is adsorbed;

an insulating base having on its surface an electrode layer (3), the electrode layer (1) and the electrode layer (3) arranged opposite to each other; and an electrolyte sealed between the metal oxide semiconductor film (2) and the electrode layer (3), wherein:
at least one of the electrode-having insulating bases is transparent; and
the metal oxide semiconductor film (2) comprises anatase titanium oxide particles.

Figure 1:
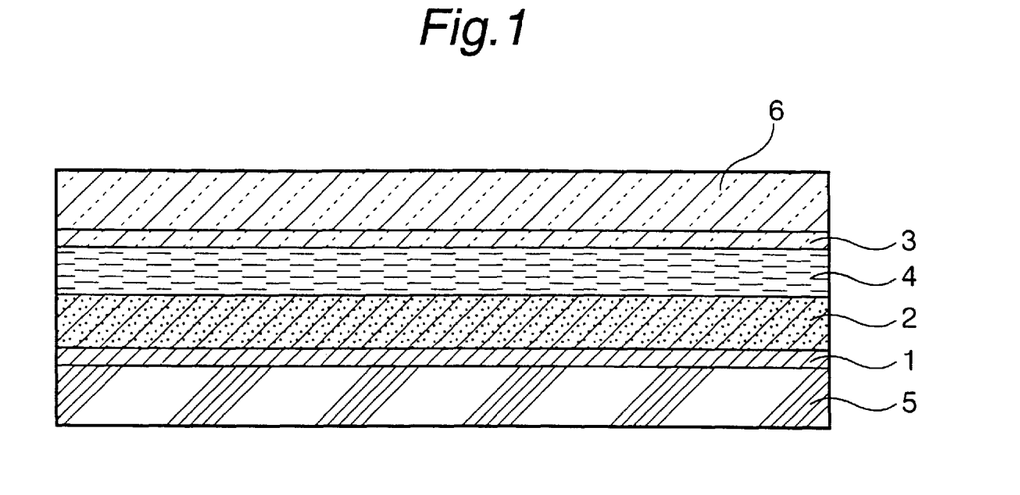
FIG. 1 is a schematic sectional view of one form of the first photoelectric cell according to the present invention.

This photoelectric cell is, for example, one shown in FIG. 1.

FIG. 1 is a schematic sectional view of one form of photoelectric cell according to the present invention. It comprises:

an insulating base 5 having on its surface an electrode layer 1, the electrode layer 1 having on its surface a metal oxide semiconductor film 2 on which a photosensitizer is adsorbed;
an insulating base 6 having on its surface a transparent electrode layer 3, the electrode layer 1 and the electrode layer 3 arranged opposite to each other; and
an electrolyte 4 sealed between the metal oxide semiconductor film 2 and the electrode layer 3.

Insulating bases can be used without any particular limitation as the insulating base 5 as long as they possess insulating properties.

Bases which are transparent and possess insulating properties, such as a glass plate and a base of PET or other polymers, can be used as transparent insulating base 6.

The electrode layer 1 on a surface of the insulating base 5 can be composed of common electrodes such as those of tin oxide, tin oxide doped with Sb, F or P, indium oxide doped with Sn and/or F, antimony oxide and platinum.

The transparent electrode layer 3 superimposed on a surface of the transparent insulating base 6 can be composed of common transparent electrodes such as those of tin oxide, tin oxide doped with Sb, F or P, indium oxide doped with Sn and/or F and antimony oxide. These electrode layers 1 and 3 can be formed on the respective insulating bases by the use of conventional methods such as the pyrolytic method and the CVD method.

The insulating base 5 may be transparent like the transparent insulating base 6. Also, the electrode layer 1 may be a transparent electrode like the transparent electrode layer 3.

It is preferred that the visible radiation transmission through the transparent insulating base 6 and the transparent electrode layer be high. For example, it is preferred that the visible radiation transmission be 50% or over, especially 90% or over. When the visible light transmission is lower than 50%, the photoelectric transfer efficiency may be unfavorably low.

The value of resistance of each of the electrode layer 1 and electrode layer 3 is preferably 10 $\Omega/cm^2$ or less. When the electrode layer resistance is higher than 10 $\Omega/cm^2$, the photoelectric transfer efficiency. may be unfavorably low.

Metal Oxide Semiconductor Film

Figure 2:
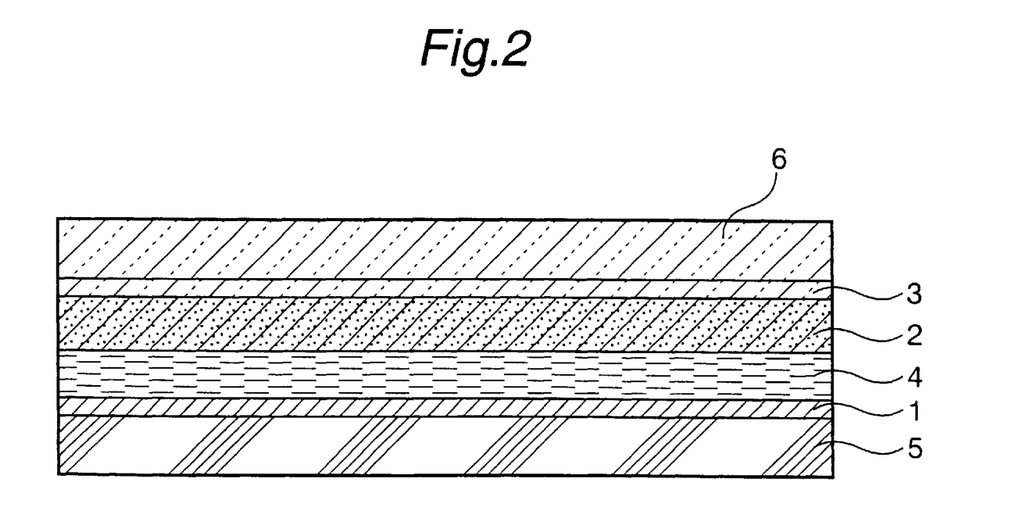
FIG. 2 is a schematic sectional view of another form of the first photoelectric cell according to the present invention.

The metal oxide semiconductor film 2 is formed on the electrode layer 1 provided on the surface of the insulating base 5. The metal oxide semiconductor film 2 may be formed on the transparent electrode layer 3 provided on the surface of the transparent insulating base 6, as shown in FIG. 2. FIG. 2 is a schematic sectional view of another form of photoelectric cell according to the present invention. Like sign characters are used through FIGS. 1 and 2.

The thickness of this metal oxide semiconductor film 2 is preferably in the range of 0.1 to 50 $\mu$m.

Anatase titanium oxide particles are contained in the metal oxide semiconductor film 2.

The anatase titanium oxide particles, as compared with other metal oxide particles, exhibit a high adsorption proportion of photosensitizer and a high electron mobility within the semiconductor film and have advantageous properties such as high stability, high safety and easy film formation.

It is preferred that the above anatase titanium oxide particles have a crystallite diameter ranging from 5 to 50 nm, especially 7 to 30 nm. The crystallite diameter of the anatase titanium oxide particles can be determined by measuring the half-value width of peak ascribed to face (1.0.1) by X-ray analysis and calculating from the measured width with the use of the Debye-Scherrer formula. When the crystallite diameter of the anatase titanium oxide particles is less than 5 nm, the electron mobility within the particles is decreased. On the other hand, when the crystallite diameter is larger than 50 nm, the adsorption amount of photosensitizer is reduced. Therefore, in both instances, the photoelectric transfer efficiency may be unfavorably low.

The anatase titanium oxide particles can be obtained by conventional methods, for example, the method in which hydrous titanic acid gel or sol is prepared by, for example, the sol gel technique and, after the addition of an acid or alkali according to necessity, the gel or sol is heated and aged.

Also, the anatase titanium oxide particles for use in the present invention can be obtained by first adding hydrogen peroxide to hydrous titanic acid gel or sol so that the hydrous titanic acid is dissolved therein and converted to peroxotitanic acid, subsequently adding an alkali, preferably ammonia and/or an amine, to the peroxotitanic acid so as to render the same alkaline and thereafter heating and aging at 80 to 350° C. Further, the anatase titanium oxide particles for use in the present invention can be obtained by adding the obtained anatase colloid particles as seed particles to peroxotitanic acid and repeating the above operations. Highly crystalline anatase titanium oxide colloid particles shown by X-ray diffraction can be obtained in this method of growing seed particles.

The terminology "peroxotitanic acid" refers to titanium peroxide hydrate. This titanium peroxide exhibits absorption in the visible radiation region, and can be prepared by adding hydrogen peroxide to a titanium compound such as titanium hydride, a titanium alkoxide or titanic acid, or to hydrous titanic acid gel or sol, followed by heating if necessary.

Sol or gel of hydrous titanium acid can be obtained by adding an acid or alkali to an aqueous solution of a titanium compound to thereby effect a hydrolysis, if necessary followed by washing, heating and aging. The employable titanium compound, although not particularly limited, can be, for example, a titanium salt such as a titanium halide or titanyl sulfate, a titanium alkoxide such as a tetraalkoxytitanium, or a titanium compound such as titanium hydride.

It is especially preferred that the anatase titanium oxide particles for use in the present invention be those obtained by adding an alkali to peroxotitanic acid and heating and aging the mixture.

The above anatase titanium oxide particles are preferably in the form of colloid particles having an average particle diameter of 5 to 600 nm. The diameter of the anatase titanium oxide particles can be measured by Laser Doppler type particle diameter measuring instrument (manufactured by NIKKISO CO., LTD.: microtrack). When the average particle diameter of the anatase titanium oxide particles is less than 5 nm, it may occur that the formed metal oxide semiconductor film is likely to have cracks, thereby rendering it difficult to form a crackless thick film having a thickness mentioned later by a small number of coating operations. Further, it may occur that the pore diameter and pore volume of the metal oxide semiconductor film are reduced to thereby cause the adsorption amount of photosensitizer to unfavorably decrease. On the other hand, when the average particle diameter of the anatase titanium oxide particles is larger than 600 nm, it may occur that the strength of the metal oxide semiconductor film is unsatisfactory.

The metal oxide semiconductor film 2 generally contains a titanium oxide binder component together with the above anatase titanium oxide particles.

This titanium oxide binder component can be, for example, a titanium oxide composed of hydrous titanic acid gel or sol obtained by the sol-gel technique or the like, or an amorphous titanium oxide binder such as a decomposition product of a peroxotitanic acid which is obtained by adding hydrogen peroxide to hydrous titanic acid gel or sol so that the hydrous titanic acid is dissolved. Of these, the decomposition product of a peroxotitanic acid is especially preferably used.

This titanium oxide binder component forms a dense homogeneous adsorption layer on the surface of anatase titanium oxide particles. By virtue of this adsorption layer, the obtained metal oxide semiconductor film can have an increased adherence to the electrode. Further, the use of the above titanium oxide binder component causes the mutual contact of anatase titanium oxide particles to change from a point contact to a face contact with the result that not only can the electron mobility be enhanced but also the adsorption amount of photosensitizer can be increased.

In the metal oxide semiconductor film 2, the weight ratio, in terms of $TiO_2$, of titanium oxide binder component to anatase titanium oxide particles (titanium oxide binder component/anatase titanium oxide particles) is preferably in the range of 0.05 to 0.50, still preferably 0.1 to 0.3. When the weight ratio is less than 0.05, it may occur that the absorption of visible radiation is unsatisfactory and that the adsorption amount of photosensitizer cannot be increased. On the other hand, when the weight ratio is higher than 0.50, it may occur that no dense semiconductor film is obtained. Further, it may occur that the electron mobility is not enhanced.

In the metal oxide semiconductor film 2, the pore volume is preferably in the range of 0.05 to 0.8 ml/g, and the average pore diameter is preferably in the range of 2 to 250 nm. When the pore volume is smaller than 0.05 ml/g, the adsorption amount of photosensitizer is likely to be unfavorably small. On the other hand, when the pore volume is larger than 0.8 ml/g, it may occur that the electron mobility within the film is decreased to thereby lower the photoelectric transfer efficiency. Also, when the average pore diameter is smaller than 2 nm, the adsorption amount of photosensitizer is likely to be unfavorably small. On the other hand, when the average pore diameter is larger than 250 nm, it may occur that the electron mobility is decreased to thereby lower the photoelectric transfer efficiency.

This metal oxide semiconductor film 2 can be prepared from the following coating liquid for forming a metal oxide semiconductor film.

Coating Liquid for Forming a Metal Oxide Semiconductor Film

The coating liquid for forming a metal oxide semiconductor film according to the present invention comprises peroxotitanic acid, anatase titanium oxide particles and a dispersion medium.

Peroxotitanic acid can be prepared by adding hydrogen peroxide to an aqueous solution of a titanium compound, or sol or gel of titanium oxide hydrate, and heating the mixture.

Sol or gel of titanium oxide hydrate can be obtained by adding an acid or alkali to an aqueous solution of a titanium compound to thereby effect a hydrolysis, if necessary followed by washing, heating and aging. The employable titanium compound, although not particularly limited, can be, for example, a titanium salt such as a titanium halide or titanium sulfate, a titanium alkoxide such as a tetraalkoxytitanium, or a titanium compound such as titanium hydride.

The anatase titanium oxide particles can be obtained by conventional methods, for example, the method in which hydrous titanic acid gel or sol is prepared by, for example, the sol-gel technique and, after the addition of an acid or alkali according to necessity, the gel or sol is heated and aged.

Also, the anatase titanium oxide particles for use in the present invention can be obtained by first adding hydrogen peroxide to hydrous titanic acid gel or sol so that the hydrous titanic acid is dissolved therein and converted to peroxotitanic acid, subsequently adding an alkali, preferably ammonia and/or an amine, to the peroxotitanic acid so as to render the same alkaline and thereafter heating and aging at 80 to 350° C. Further, the anatase titanium oxide particles for use in the present invention can be obtained by adding the obtainable anatase particles as seed particles to peroxotitanic acid and repeating the above operations.

In the present invention, especially, those obtained by adding an alkali to peroxotitanic acid and heating and aging the mixture are preferably used as the anatase titanium oxide particles.

It is preferred that the above anatase titanium oxide particles have a crystallite diameter ranging from 5 to 50 nm, especially 7 to 30 nm. Further, the anatase titanium oxide particles are preferably in the form of colloid particles having an average particle diameter of 5 to 600 nm. When the average particle diameter of the anatase titanium oxide particles is less than 5 nm, it may occur that the formed metal oxide semiconductor film is likely to have cracks, thereby rendering it difficult to form a crackless thick film having a thickness mentioned later by a small number of coating operations. Further, it may occur that the pore diameter and pore volume of the metal oxide semiconductor film are reduced to thereby cause the adsorption amount of photosensitizer to unfavorably decrease. On the other hand, when the average particle diameter of the anatase titanium oxide particles is larger than 600 nm, it may occur that the strength of the metal oxide semiconductor film is unsatisfactory.

In the coating liquid for forming a metal oxide semiconductor film for use in a photoelectric cell according to the present invention, the weight ratio, in terms of $TiO_2$, of peroxotitanic acid to anatase titanium oxide particles (peroxotitanic acid/anatase titanium oxide particles) is preferably in the range of 0.05 to 0.50, still preferably 0.1 to 0.3. When the weight ratio is less than 0.05, it may occur that the absorption of visible-region light is unsatisfactory and that the adsorption amount of photosensitizer cannot be increased. On the other hand, when the weight ratio is higher than 0.50, it may occur that no dense semiconductor film is obtained. Further, it may occur that the electron mobility is not enhanced.

The above peroxotitanic acid and anatase titanium oxide particles are preferably contained in the coating liquid for forming a metal oxide semiconductor film for use in a photoelectric cell in a concentration of 1 to 30% by weight, still preferably 2 to 20% by weight, in terms of $TiO_2$.

The employed dispersion medium is not particularly limited as long as the peroxotitanic acid and titanium oxide particles can be dispersed therein and the dispersion medium can be removed by drying. In particular, alcohols are preferred.

Furthermore, if necessary, a film formation auxiliary may be contained in the coating liquid for forming a metal oxide semiconductor film for use in a photoelectric cell according to the present invention. The film formation auxiliary can be, for example, any of polyethylene glycol, polyvinylpyrrolidone, hydroxypropylcellulose, polyacrylic acid and polyvinyl alcohol. When the film formation auxiliary is contained in the coating liquid, the viscosity of the coating liquid is increased to thereby enable obtaining a uniformly dried film. Further, the anatase titanium particles are densely packed in the metal oxide semiconductor to thereby increase the bulk density. Thus, the metal oxide semiconductor film exhibiting high adherence to the electrode can be obtained.

Process for Producing a Metal Oxide Semiconductor Film for use in a Photoelectric Cell The above metal oxide semiconductor film for use in a photoelectric cell can be produced by applying the above coating liquid for forming a metal oxide semiconductor film for use in a photoelectric cell onto the electrode layer on a base or base surface, drying the applied coating and hardening the dried coating film.

The coating liquid is preferably applied in such an amount that the thickness of the finally formed metal oxide semiconductor film is in the range of 0.1 to 50 $\mu$m. With respect to the application method, the coating liquid can be applied by conventional methods such as the dipping, spinner, spray, roll coater and flexographic printing methods.

The drying temperature is not limited as long as the dispersion medium can be removed.

The thus formed coating film is preferably hardened by, generally, irradiating the same with ultraviolet light. The ultraviolet light irradiation is performed in such a dose as required for decomposition of peroxotitanic acid and hardening, although varied depending on, for example, the content of peroxotitanic acid. When the film formation auxiliary is contained in the coating liquid, heating may be performed after the hardening of the coating film to thereby decompose the film formation auxiliary.

In the present invention, it is preferred that, after the hardening of the coating film by ultraviolet light irradiation, the coating film be irradiated with ions of at least one gas selected from among $O_2$, $N_2$, $H_2$, neon, argon, krypton and other inert gases of Group 0 of the periodic table and thereafter annealed.

With respect to the ion irradiation, it can be accomplished by the employment of known methods such as the method of infiltrating a fixed amount of boron or phosphorus to a fixed depth in a silicon wafer at the time of manufacturing IC and LSI. The annealing is performed by heating at 200 to 500° C., preferably 250 to 400° C., for a period of 10 min to 20 hr.

By virtue of the above gas ion irradiation, a multiplicity of defects are formed at the surface of titania particles without the remaining of ions within the titanium oxide film. Moreover, the crystallinity of anatase crystals after annealing is enhanced, and the mutual joining of particles is promoted. Therefore, not only is the bonding strength thereof with the photosensitizer increased but also the adsorption amount of photosensitizer is augmented. Furthermore, the enhancement of anatase crystallinity and the promotion of particle joining increase the electron mobility. Consequently, the photoelectric transfer efficiency can be enhanced.

The thickness of the thus obtained metal oxide semiconductor film is preferably in the range of 0.1 to 50 $\mu$m.

In the photoelectric cell of the present invention, the metal oxide semiconductor film 2 has a photosensitizer adsorbed thereon.

The photosensitizer is not particularly limited as long as it is capable of absorbing visible radiation region and/or infrared radiation region radiation to thereby excite itself. For example, an organic dye or a metal complex can be used as the photosensitizer.

Common organic dyes having, in the molecules thereof, functional groups such as carboxyl, hydroxyalkyl, hydroxyl, sulfone and carboxyalkyl groups can be used as the above organic dye. Examples of organic dye include metal-free phthalocyanines, cyanine dyes, metalocyanine dyes, triphenylmethane dyes, and xanthene dyes such as uranine, eosine, Rose Bengale, Rhodamine B and dibromofluorescein. These organic dyes are characterized in that the adsorption velocity on the metal oxide semiconductor film is high.

On the other hand, as the metal complex, metal phthalocyanines such as copper phthalocyanine and titanylphthalocyanine; chlorophyll; hemin; ruthenium cis-diaquabipyridyl complexes such as ruthenium tris (2,2'-bispyridyl-4,4'-dicarboxylate), cis-(SCN$^-$)-bis(2,2'-bipyridyl-4,4'-dicarboxylato) ruthenium and ruthenium cis-diaqua-bis (2,2'-bipyridyl-4,4'-dicarboxylate); porphyrin such as zinc tetra (4-carboxyphenyl) porphine; and ruthenium, osmium, iron and zinc complexes such as iron hexacyanide complex, as described in, for example, Japanese Patent Laid-open Publication No. 1(1989)-220380 and Japanese Translation of PCT Patent Applications from Other States, No. 5(1993)-504023, can be used. These metal omplexes have excellent spectral sensitization effect and high durability.

The above organic dyes and metal complexes may be used either individually or in mixture, and, further, the organic dyes can be used in combination with the metal complexes.

The method of adsorbing these photosensitizers is not particularly limited. For example, a solution in which a photosensitizer is dissolved is adsorbed into the metal oxide semiconductor film by means of the customary method such as the dipping, spinner or spray method and thereafter dried. If necessary, the absorbing operation can be repeated. Alternatively, the photosensitizer solution, while being heated and refluxed, is brought into contact with the above base having the metal oxide semiconductor film so that the photosensitizer can be adsorbed on the metal oxide semiconductor film.

The solvent for dissolving photosensitizers is not limited as long as it is capable of dissolving them. For example, any of water, alcohols, toluene, dimethylformamide, chloroform, ethylcellosolve, N-methylpyrrolidone and tetrahydrofuran can be used.

The amount of photosensitizer adsorbed on the metal oxide semiconductor film is preferably 50 $\mu$g or more per cm$^2$ of specific surface area of the metal oxide semiconductor film. When the amount of photosensitizer is less than 50 $\mu$g, it may occur that the photoelectric transfer efficiency is unsatisfactory.

The photoelectric cell of the present invention is fabricated by first arranging the electrode-furnished insulating bases so that the metal oxide semiconductor film 2 is opposite to the transparent electrode layer 3 (when the metal oxide semiconductor film 2 is superimposed on the transparent electrode layer 3 as shown in FIG. 2, arrangement is made so that the metal oxide semiconductor film 2 is opposite to the electrode layer 1), subsequently sealing the side faces with a resin or the like and thereafter charging an electrolyte 4 between the electrodes.

A mixture of an electrochemically active salt and at least one compound capable of forming an oxidation-reduction system therewith is used as the electrolyte 4.

The electrochemically active salt can be, for example, a quaternary ammonium salt such as tetrapropylammonium iodide. The compound capable of forming an oxidation-reduction system therewith can be, for example, any of quinone, hydroquinone, iodide ($I^-/I_3^-$), potassium iodide, bromide ($Br^-/Br_3^-$) and potassium bromide.

In the present invention, if necessary, a solvent can be added to the electrolyte 4 so that the electrolyte 4 has the form of a solution. The added solvent is preferably one wherein the photosensitizer solubility is low to such an extent that the photosensitizer adsorbed on the metal oxide semiconductor film is not desorbed and dissolved in the solvent. The solvent can be, for example, any of water, alcohols, oligoethers, carbonates such as propione carbonate, phosphoric esters, dimethylformamide, dimethylsulfoxide, N-methylpyrrolidone, N-vinylpyrrolidone, sulfur compounds such as sulfolane 66, ethylene carbonate and acetonitrile.

The described first photoelectric cell of the present invention ensures high electron mobility within the semiconductor film to thereby be excellent in photoelectric transfer efficiency, because the semiconductor film containing anatase titanium oxide particles capable of having a large amount of photosensitizer adsorbed thereon is formed in the photoelectric cell.

Second Photoelectric Cell

The second photoelectric (photovoltaic) cell of the present invention comprises:

an insulating base having on its surface an electrode layer (i), the electrode layer (i) having on its surface a metal oxide semiconductor layer (ii) on which a photosensitizer is adsorbed;

an insulating base having on its-surface an electrode layer (iii), the electrode layer (i) and the electrode layer (iii) arranged opposite to each other; and an electrolyte sealed between the metal oxide semiconductor layer (ii) and the electrode layer (iii), wherein:

conductive protrusions (iv) jutting from the surface of the electrode layer (i) exist, the metal oxide semiconductor layer (ii) formed so as to cover the conductive protrusions (iv) and electrode layer (i), and at least one of the electrode-layer-having insulating bases is transparent.

Figure 3:
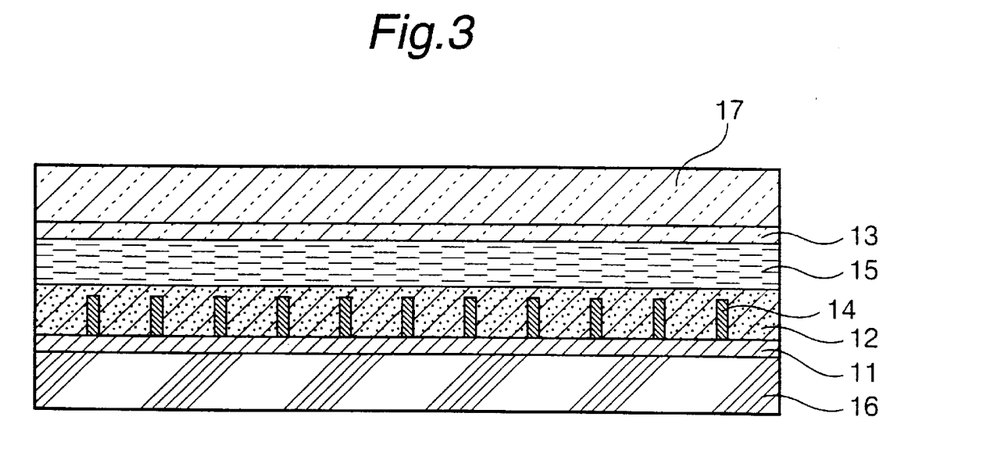
FIG. 3 is a schematic sectional view of one form of the second photoelectric cell according to the present invention.

An example of this photoelectric cell is one shown in FIG. 3.

FIG. 3 is a schematic sectional view of one form of the second photoelectric cell according to the present invention. The second photoelectric cell comprises:

an insulating base 16 having on its surface an electrode layer 11, the electrode layer 11 having on its surface conductive protrusions 14 jutting therefrom, a metal oxide semiconductor layer 12 on which a photosensitizer is adsorbed being formed so as to cover the conductive protrusions 14 and the electrode layer (i);

a transparent insulating base 17 having on its surface a transparent electrode layer 13, the electrode layer 11 and the electrode layer 13 arranged opposite to each other; and an electrolyte 15 sealed between the metal oxide semiconductor layer 12 and the transparent electrode layer 13.

The insulating base 16 is not particularly limited as long as it possesses insulating properties. The same insulating bases as mentioned with respect to the first photoelectric cell can be employed.

Also, the same bases which are transparent and possess insulating properties, such as a glass plate and a base of PET or other polymers, as mentioned with respect to the first photoelectric cell can be employed as the transparent insulating base 17.

The electrode layer 11 on the surface of the insulating base 16 and the conductive protrusions 14 jutting from the surface of the electrode layer 11 can be composed of common conductive materials such as tin oxide, tin oxide doped with Sb, F or P, indium oxide doped with Sn and/or F, antimony oxide and platinum. The electrode layer 11 and the conductive protrusions 14 may be composed of the same conductive material or may be composed of different conductive materials.

The configuration of the conductive protrusions is not limited to the cuboid structure shown in FIG. 3, and the conductive protrusions may have, for example, a net or band structure.

The electrode layer 11 is electrically connected with the conductive protrusions 14. The method of forming the electrode layer 11 and the conductive protrusions 14 is not particularly limited. The formation thereof can be accomplished by, for example, the method in which an electrode film is superimposed on the insulating base by the pyrolytic technique, the CVD technique, the vapor deposition technique or the like, subsequently a resist is applied onto a surface of the electrode film, thereafter patterning for the conductive protrusions 14 is carried out, and finally the resist is etched.

Figure 4:
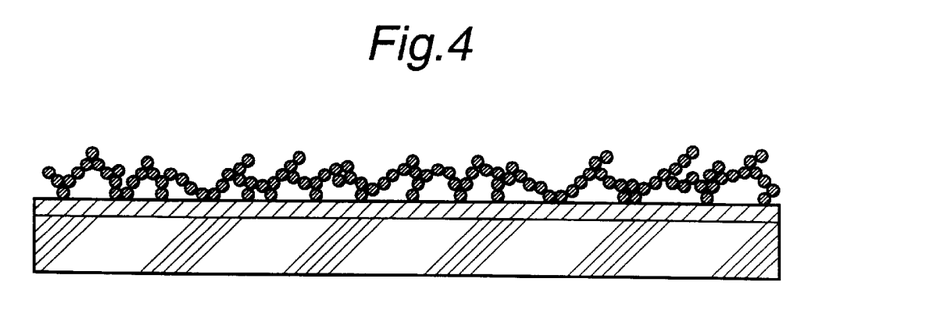
FIG. 4 is an enlarged sectional view of one form of conductive protrusion contour.
Figure 5:
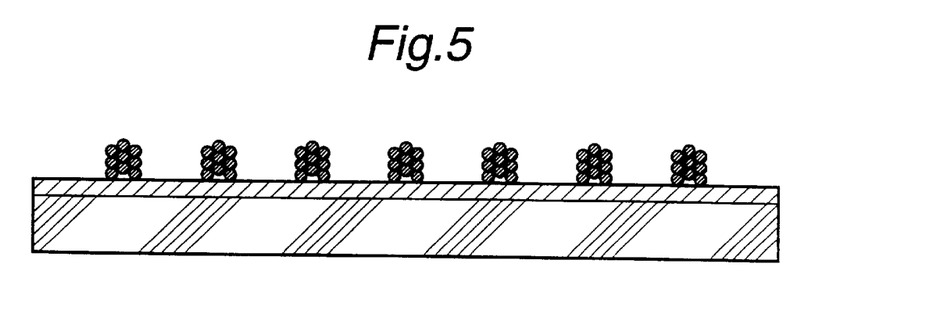
FIG. 5 is an enlarged sectional view of one form of conductive protrusion contour.

After the formation of the electrode layer 11 by the CVD technique, the vapor deposition technique or the like, a conductive particle layer may be formed by applying a coating liquid containing conductive particles composed of the above conductive materials to thereby provide the conductive protrusions 14. The formation of protrusions in this manner enables providing those of a net structure as shown in FIG. 4. Alternatively, the conductive protrusions 14 can be formed by applying a coating liquid containing conductive particles composed of a conductive material to thereby provide a conductive particle layer of closest packing, subsequently coating a layer surface with a resist, thereafter performing patterning for the conductive protrusions 14, and finally etching the resist (see FIG. 5).

The individual conductive protrusions 14 are preferably positioned with a spacing therebetween which is at least twice the average thickness of the metal oxide semiconductor layer 12. The height of the conductive protrusions 14 is preferably in the range of 20 to 98% of the thickness of the metal oxide semiconductor layer including the conductive protrusions 14. When the height falls within this range, the electrons within the metal oxide semiconductor layer rapidly move to the electrode layer 11 without recombining with the photosensitizer, so that the photoelectric transfer efficiency of the photoelectric cell can be enhanced. When the height is less than 20%, the effect of increasing the velocity of electron move to the electrode layer 11 is unsatisfactory. On the other hand, when the height is greater than 98%, it may occur that the conductive protrusions may be electrically connected with the electrolyte.

The transparent electrode layer 13 formed on the surface of the transparent insulating base 17 can be composed of transparent electrodes such as those of tin oxide, tin oxide doped with Sb, F or P, indium oxide, indium oxide doped with Sn and/or F and antimony oxide. This transparent electrode layer 13 can be formed by the use of conventional methods such as the pyrolytic method, the CVD method and the vapor deposition method.

It is preferred that the visible light transmission through the insulating base 16 and the electrode layer 13 be high, for example, 50% or more, especially 90% or more. When the visible light transmission is less than 50%, the photoelectric transfer efficiency is unfavorably low.

In the photoelectric cell of the present invention, it is requisite that at least one of the pair of electrode-layer-having insulating bases be transparent. Therefore, the photoelectric cell is not limited to the structure of FIG. 3. For example, referring to FIG. 6, transparent conductive protrusions 14 may be formed on the surface of the transparent electrode layer 13 on transparent insulating base 17. Furthermore, all of the insulating bases 16 and 17, electrode layers 11 and 13 and conductive protrusions 14 may be transparent.

Figure 6:
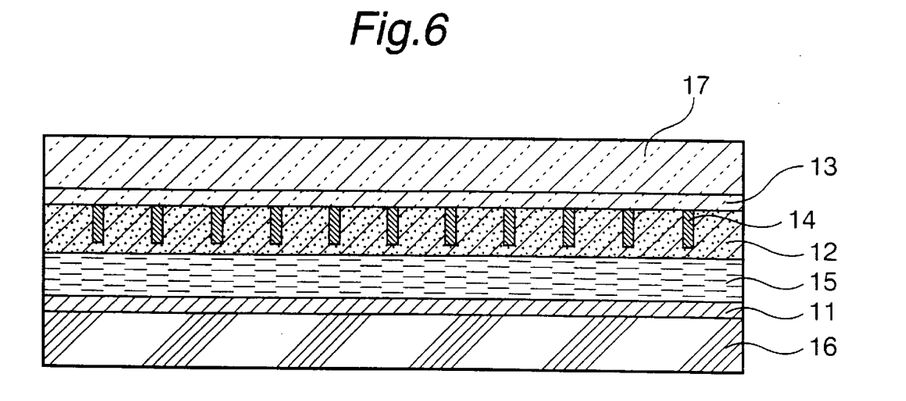
FIG. 6 is a schematic sectional view of another form of the second photoelectric cell according to the present invention.

It is generally preferred that the value of resistance of each of the above electrode layers 11 and 13 and conductive protrusions 14 be 50 $\Omega/cm^2$ or less. When the electrode layer resistance is higher than 50 $\Omega/cm^2$, also, the photoelectric transfer efficiency may be unfavorably low.

In the photoelectric cell of the present invention, the metal oxide semiconductor layer 12 is formed so as to cover the electrode layer 11 and conductive protrusions 14.

The metal oxide semiconductor layer 12 may have the conductive protrusions 14 buried therein, or may be formed along a contour of the electrode layer 11 and conductive protrusions 14.

Figure 7:
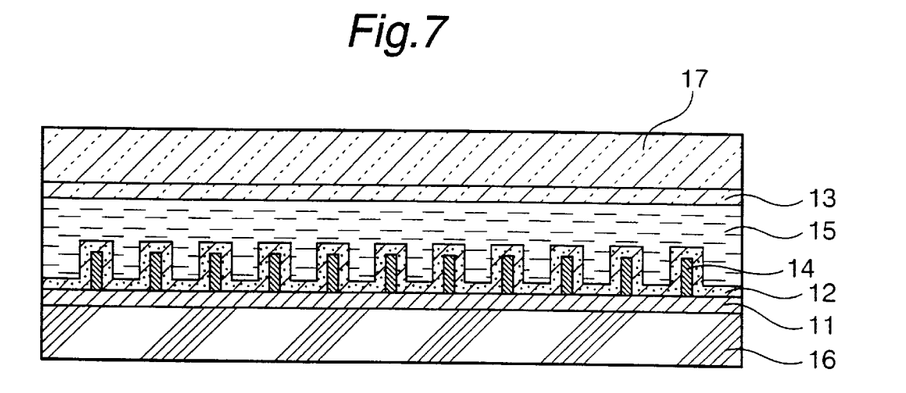
FIG. 7 is a schematic sectional view of a further form of the second photoelectric cell according to the present invention.

It is especially preferred that the metal oxide semiconductor layer be formed along a contour of the electrode layer 11 and conductive protrusions 14, as shown in FIG. 7. In this structure, not only does the electrolyte infiltrate in the metal oxide semiconductor layer to thereby increase the area of contact of the electrolyte with the metal oxide semiconductor layer, but also the quantity of light incident on the metal oxide semiconductor layer and the adsorption amount of photosensitizer are increased. As a result, the photoelectric transfer efficiency can be enhanced.

The thickness of the metal oxide semiconductor layer including the conductive protrusions 14 is preferably in the range of 0.1 to 500 $\mu$m. The thickness of the metal oxide semiconductor layer superimposed on the conductive protrusions or electrode layer surface is preferably in the range of 0.1 to 50 $\mu$m.

Figure 8:
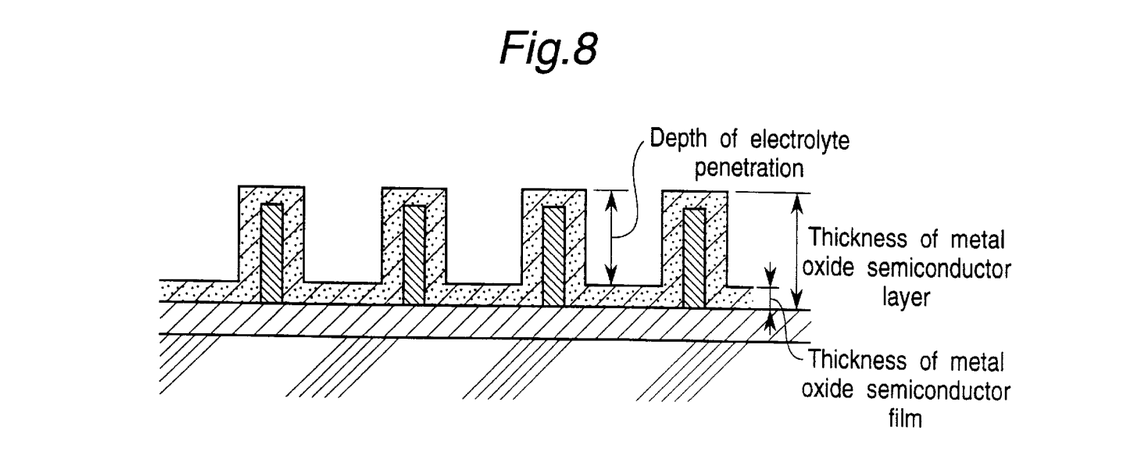
FIG. 8 is a schematic view showing the definition of the thickness of metal oxide semiconductor layer disposed in the second photoelectric cell.

The average thickness of the metal oxide semiconductor layer refers to the average of thickness of the metal oxide semiconductor layer including conductive protrusions, as illustrated in FIG. 8. The film thickness of the metal oxide semiconductor layer refers to the thickness of the metal oxide semiconductor layer on the electrode layer and conductive protrusion surface. The depth of infiltration of the electrolyte in the metal oxide semiconductor layer (depth of electrolyte infiltration) is preferably in the range of 20 to 90% of the thickness of the metal oxide semiconductor layer. When the depth of electrolyte infiltration is less than 20%, the effect of increasing the quantity of incident light is not satisfactory. On the other hand, when it exceeds 90%, it may occur that the strength of the metal oxide semiconductor layer is unsatisfactory.

It is preferred that the metal oxide semiconductor layer comprise spherical particles of a metal oxide such as titanium oxide, lanthanum oxide, zirconium oxide, niobium oxide, tungsten oxide, strontium oxide, zinc oxide, tin oxide or indium oxide.

These metal oxide spherical particles preferably have an average particle diameter ranging from 5 to 600 nm. In the use of spherical particles, a uniform pore structure depending on particle diameter can be formed when the particles are closely packed. Further, in the use of spherical particles, a uniform surface condition is obtained. Therefore, the electron move from the photosensitizer to the metal oxide semiconductor layer can efficiently be carried out with the result that the electron mobility is enhanced. The diameter of the metal oxide particles can be measured by Laser Doppler type particle diameter measuring instrument (manufactured by NIKKISO CO., LTD.: microtrack). When the average particle diameter of the metal oxide particles is less than 5 nm, it may occur that the formed metal oxide semiconductor layer is likely to have cracks, thereby rendering it difficult to form a crackless metal oxide semiconductor layer by a small number of coating operations. Further, it may occur that the pore diameter and pore volume of the metal oxide semiconductor layer are reduced to thereby cause the adsorption amount of photosensitizer to unfavorably decrease. On the other hand, when the average particle diameter of the metal oxide particles is larger than 600 nm, it may occur that the strength of the metal oxide semiconductor layer is unsatisfactory.

It is preferred that these metal oxide spherical particles be composed of anatase titanium oxide as described with respect to the first photoelectric cell.

In the second photoelectric cell of the present invention, spherical particles having a core-shell structure comprising a metal oxide core particle of 0.1 to 500 nm in average particle diameter having its surface covered with a shell composed of the above metal oxide can also be preferably used as the metal oxide spherical particles. With respect to the spherical particles having a core-shell structure, the core particle, although not particularly limited as long as it is spherical, preferably consists of silica or the like from which particles of perfect sphere can be easily obtained. Further, with respect to the metal oxide particles having a core-shell structure, the shell is composed of the above metal oxide, preferably titanium oxide, still preferably anatase titanium oxide.

The spherical particles having a core-shell structure can be obtained by slowly adding peroxotitanic acid to a dispersion of core particles whose diameter falls within the above range, if necessary, while heating.

When the particles per se are composed of anatase titanium oxide, or when the shell of particle having the core-shell structure is composed of anatase titanium oxide, as compared with particles composed of other metal oxides, the adsorption amount of photosensitizer is large, the electron mobility from the photosensitizer to the metal oxide semiconductor and the electron mobility within the metal oxide semiconductor layer are high, and there can be realized advantageous properties such as high stability, high safety and easy film formation.

The metal oxide semiconductor layer may contain a binder component together with the above spherical particles of metal oxide.

The same binder component as mentioned with respect to the first photoelectric cell can be employed in this metal oxide semiconductor layer.

When anatase titanium oxide particles or spherical particles having a core-shell structure wherein the shell is composed of anatase titanium oxide are used as the spherical particles, the use of a product of hydrolysis/condensation polymerization of peroxotitanic acid as the binder component enables forming a dense homogeneous adsorption layer on the surface of anatase titanium oxide particles. Thus, the obtained metal oxide semiconductor layer enables increasing the adherence to the electrode. Further, by using such a peroxotitanic acid as the binder component changes the mutual contact of anatase titanium oxide particles is changed from a point contact to a surface contact, thereby enabling enhancing the electron mobility.

In the metal oxide semiconductor layer, the weight ratio, in terms of oxide, of binder component to metal oxide spherical particles (binder component/metal oxide spherical particles) is preferably in the range of 0.05 to 0.7, still preferably 0.1 to 0.5. When the weight ratio is less than 0.05, it may occur that the strength of the metal oxide semiconductor layer is unsatisfactory and that the adherence of the metal oxide semiconductor layer to the electrode is not satisfactory. On the other hand, when the weight ratio is higher than 0.7, it may occur that the diameter of formed pores is so small that the electron delivery between the electrolyte and the photosensitizer tends to be restricted with the result that the photoelectric transfer efficiency cannot be enhanced.

In the metal oxide semiconductor layer, the pore volume is preferably in the range of 0.05 to 0.8 ml/g, and the average pore diameter is preferably in the range of 2 to 250 nm. When the pore volume is smaller than 0.05 ml/g, the adsorption amount of photosensitizer is likely to be unfavorably small. On the other hand, when the pore volume is larger than 0.8 ml/g, it may occur that the electron mobility within the layer is decreased to thereby lower the photoelectric transfer efficiency. Also, when the average pore diameter is smaller than 2 nm, the adsorption amount of photosensitizer is likely to be unfavorably small. On the other hand, when the average pore diameter is larger than 250 nm, it may occur that the electron mobility is decreased to thereby lower the photoelectric transfer efficiency.

This metal oxide semiconductor layer can be formed by applying a coating liquid for forming a metal oxide semiconductor layer for use in a photoelectric cell, which comprises metal oxide spherical particles and a dispersion medium together with a binder according to necessity, and drying the applied coating liquid.

The employed dispersion medium is not particularly limited as long as the metal oxide particles and binder component can be dispersed therein and the dispersion medium can be removed by drying. In particular, alcohols are preferred.

Furthermore, if necessary, a film formation auxiliary may be contained in the coating liquid. The film formation auxiliary can be, for example, any of polyethylene glycol, polyvinylpyrrolidone, hydroxypropylcellulose, polyacrylic acid and polyvinyl alcohol.

When the film formation auxiliary is contained in the coating liquid, the viscosity of the coating liquid is increased to thereby enable obtaining a uniformly dried layer. Further, the spherical particles are densely packed. Thus, the metal oxide semiconductor layer exhibiting high adherence to the electrode can be obtained. The same coating liquid as used in the first photoelectric cell is also suitable to this photoelectric cell.

The coating liquid is preferably applied in such an amount that the thickness of the finally formed metal oxide semiconductor layer is in the range of 0.1 to 50 $\mu$m. With respect to the application method, the coating liquid can be applied by conventional methods such as the dipping, spinner, spray, roll coater and flexographic printing methods and transferring method.

The drying temperature is not limited as long as the dispersion medium can be removed. When peroxotitanic acid is contained as the binder component, if necessary, the dried layer may further be irradiated with ultraviolet light to thereby harden the peroxotitanic acid. The ultraviolet light irradiation is performed in such a dose as required for decomposition and hardening of peroxotitanic acid, although varied depending on, for example, the content of peroxotitanic acid. When the film formation auxiliary is contained in the coating liquid, heating may be performed after the hardening to thereby decompose the film formation auxiliary.

In the same manner as in the production of the first photoelectric cell, the thus formed metal oxide semiconductor layer may be subjected to implantation of ions of at least one gas selected from among $O_2$, $N_2$, $H_2$, neon, argon, krypton and other inert gases of Group 0 of the periodic table and thereafter annealing.

In the second photoelectric cell, a photosensitizer is adsorbed on the metal oxide semiconductor layer in the same manner as in the first photoelectric cell.

The same photosensitizer as in the first photoelectric cell can be used. The method of adsorbing the photosensitizer is not particularly limited, and the photosensitizer can be adsorbed in the same manner as mentioned with respect to the first photoelectric cell. The adsorption amount of photosensitizer on the metal oxide semiconductor layer is preferably 100 $\mu$g or more per 1 $cm^2$ of specific surface area of the metal oxide semiconductor layer. When the amount of photosensitizer is less than 100 $\mu$g, it may occur that the photoelectric transfer efficiency is unsatisfactory.

In the same manner as mentioned with respect to the first photoelectric cell, the second photoelectric cell of the present invention is fabricated by first arranging the electrode-furnished insulating bases so that the metal oxide semiconductor layer 12 is opposite to the transparent electrode layer 13, subsequently sealing the side faces with a resin or the like and thereafter charging an electrolyte between the electrodes.

The same electrolyte as mentioned with respect to the first photoelectric cell can be used as the electrolyte 15.

In the described second photoelectric cell of the present invention, the specified conductive protrusions are formed on the electrode surface. Thus, generated electrons can rapidly move to the electrode. The electrons do not recombine with the photosensitizer. Moreover, in this photoelectric cell, the adsorption proportion of photosensitizer is high, and moving of generated electrons is smooth. Therefore, the second photoelectric cell of the present invention is excellent in photoelectric transfer efficiency.

The present invention enables obtaining the photoelectric cell which ensures high photoelectric transfer efficiency and is hence applicable to various photoelectric transfer uses.

Further, the metal oxide semiconductor film which is excellent in photoelectric transfer efficiency can be obtained from the coating liquid for forming a metal oxide semiconductor film for use in a photoelectric cell according to the present invention.

EXAMPLES

The present invention will be further illustrated below with reference to the following Examples, which in no way limit the scope of the invention.

Example 1

5 g of titanium hydride was suspended in 1 lit. of pure water, 400 g of a hydrogen peroxide solution of 5% by weight concentration was added to the suspension over a period of 30 min, and heated to 80° C. to effect dissolution. Thus, a solution of peroxotitanic acid was obtained. 90% by volume was divided from the whole amount of the solution, and its pH was adjusted to 9 by adding concentrated aqueous ammonia. The resultant mixture was placed in an autoclave and subjected to a hydrothermal treatment at 250° C. for 5 hr under saturated vapor pressure. Thus, titania colloid particles were obtained. The obtained titania colloid particles were analyzed by X-ray diffractometry. As a result, it was found that they consisted of highly crystalline anatase titanium oxide. The crystallite diameter and average particle diameter of the titania colloid particles are listed in Table 1.

Subsequently, the obtained titania colloid particles were concentrated to a concentration of 10% by weight and mixed with the peroxotitanic acid solution. Hydroxypropylcellulose as a film formation auxiliary was added to the mixture in an amount of 30% by weight based on the titanium contents, in terms of $TiO_2$, of the mixture. Thus, a coating liquid for forming a semiconductor film was obtained.

Thereafter, this coating liquid was applied onto a transparent glass plate covered with a transparent electrode layer of fluoride-doped tin oxide on the side of the transparent electrode layer, and then coating film was air-dried and irradiated with 6000 $mJ/cm^2$ ultraviolet light by means of a low pressure mercury lamp. Thus, the peroxotitanic acid was decomposed and the coating film was hardened. The coating film was heated at 300° C. for 30 min to thereby carry out hydroxypropylcellulose decomposition and annealing. Thus, a metal oxide semiconductor film was formed.

With respect to the formed metal oxide semiconductor film, the film thickness and the pore volume and average pore diameter measured by the nitrogen adsorption technique are listed in Table 1.

Adsorption of Photosensitizer

A ruthenium complex of cis-($SCN^-$)-bis (2,2'-bipyridyl-4,4'-dicarboxylato) ruthenium (II) as a photosensitizer was dissolved in ethanol in a concentration of $3 \times 10^{-4}$ mol/lit. The thus obtained photosensitizer solution was applied onto the metal oxide semiconductor film by the use of 100 rpm spinner, and dried. These application and drying operations were repeated five times. The photosensitizer adsorption amount of the obtained metal oxide semiconductor film is listed in Table 1.

Preparation of Photoelectric Cell

Acetonitrile and ethylene carbonate were mixed together in a volume ratio (acetonitrile:ethylene carbonate) of 1:4 to thereby obtain a solvent. Tetrapropylammonium iodide and iodine were dissolved in respective concentrations of 0.46 and 0.06 mol/lit. in the solvent to thereby obtain an electrolyte solution.

The above obtained electrode on glass plate, as one electrode, and a transparent glass plate covered with an electrode of fluoride-doped tin oxide having platinum superimposed thereon, as a counter electrode, were arranged so that the one electrode and the counter electrode were opposite to each other. The sides thereof were sealed with a resin, and the above electrolyte solution was charged so as to lie between the two electrodes. These electrodes were electrically connected to each other by a lead. Thus, a photoelectric cell was obtained.

The photoelectric cell was irradiated with light of 100 $W/m^2$ intensity by means of a solar simulator. The Voc (voltage in open circuit condition), Joc (density of current flowing at a short circuit), FF(curve factor) and η (transfer efficiency) were measured.

The results are given in Table 1.

Example 2

A metal oxide semiconductor film was produced in the same manner as in Example 1, except that, after the perox-otitanic acid decomposition and film hardening by ultraviolet irradiation, Ar gas ion irradiation was carried out (irradiated at 200 eV for 10 hr with the use of ion implanter manufactured by Nissin Electric Co., Ltd.).

The pore volume and average pore diameter of the obtained metal oxide semiconductor film are listed in Table 1.

Adsorption of Photosensitizer

An adsorption of photosensitizer on the obtainable titanium oxide film was performed in the same manner as in Example 1.

The adsorption amount of photosensitizer is listed in Table 1.

Preparation of Photoelectric Cell

A photoelectric cell was prepared in the same manner as in Example 1, and the Voc, Joc, FF and η thereof were measured.

The results are given in Table 1.

Example 3

18.3 g of titanium tetrachloride was diluted with pure water, thereby obtaining an aqueous solution of 1.0% by weight concentration in terms of $TiO_2$. Aqueous ammonia of 15% by weight concentration was added to the aqueous solution under agitation, thereby obtaining a white slurry of pH 9.5. This slurry was filtered and washed, thereby obtaining a cake of titanium oxide hydrate gel of 10.2% by weight in terms of $TiO_2$. This cake was mixed with 400 g of a hydrogen peroxide solution of 5% concentration, and heated to 80° C. to thereby effect dissolution. Thus, a solution of peroxotitanic acid was obtained. 90% by volume was divided from the whole amount of the solution, and its pH was adjusted to 9 by adding concentrated aqueous ammonia. The resultant mixture was placed in an autoclave and subjected to a hydrothermal treatment at 250° C. for 5 hr under saturated vapor pressure. Thus, titania colloid particles were obtained. The obtained titania colloid particles were analyzed by X-ray diffractometry, and it was found that they consisted of highly crystalline anatase titanium oxide. The crystallite diameter and average particle diameter of the obtained particles are listed in Table 1.

From the obtained peroxotitanic acid solution and titania colloid particles, a metal oxide semiconductor film was formed in the same manner as in Example 1. The thickness, pore volume and average pore diameter of the obtained metal oxide semiconductor film are listed in Table 1.

Adsorption of Photosensitizer

An adsorption of photosensitizer was performed in the same manner as in Example 1. The photosensitizer adsorption amount of the obtained metal oxide semiconductor film is listed in Table 1.

Preparation of Photoelectric Cell

A photoelectric cell was prepared in the same manner as in Example 1, and the Voc, Joc, FF and η thereof were measured. The results are given in Table 1.

Comparative Example 1

18.3 g of titanium tetrachloride was diluted with pure water, thereby obtaining an aqueous solution of 1.0% by weight concentration in terms of $TiO_2$. Aqueous ammonia of 15% by weight concentration was added to the aqueous solution under agitation, thereby obtaining a white slurry of pH 9.5. This slurry was filtered and washed, and suspended in pure water to thereby obtain a slurry of titanium oxide hydrate gel of 0.6% by weight concentration in terms of $TiO_2$. The pH of the slurry was adjusted to 2 by adding hydrochloric acid. The resultant slurry was placed in an autoclave and subjected to a hydrothermal treatment at 180° C. for 5 hr under saturated vapor pressure. Thus, titania colloid particles were obtained. The crystal form of the obtained particles was analyzed by X-ray diffractometry, and it was found that the particles were amorphous. The average particle diameter of the titania colloid particles is listed in Table 1.

Subsequently, the obtained titania colloid particles were concentrated to a concentration of 10% by weight. Hydroxypropylcellulose as a film formation auxiliary was added thereto in an amount of 30% by weight in terms of $TiO_2$. Thus, a coating liquid for forming a semiconductor film was obtained. Thereafter, this coating liquid was applied onto a transparent glass plate covered with an electrode layer of fluoride-doped tin oxide on the side of the electrode layer, and then the coating film was air-dried and irradiated with 6000 mJ/cm$^2$ ultraviolet light by means of a low pressure mercury lamp. Thus, the coating film was hardened. The coating film was heated at 300° C. for 30 min to thereby carry out hydroxypropylcellulose decomposition and annealing. Thus, a metal oxide semiconductor film was formed.

With respect to the formed metal oxide semiconductor film, the film thickness and the pore volume and average pore diameter measured by the nitrogen adsorption technique are listed in Table 1.

Adsorption of Photosensitizer

An adsorption of photosensitizer was performed in the same manner as in Example 1. The photosensitizer adsorption amount of the obtained metal oxide semiconductor film is listed in Table 1.

Preparation of Photoelectric Cell

A photoelectric cell was prepared in the same manner as in Example 1, and the Voc, Joc, FF and η thereof were measured.

The results are given in Table 1.

Comparative Example 2

Titania colloid particles obtained in the same manner as in Example 1 were dried and annealed at 550° C. for 2 hr, thereby obtaining titania particles. The obtained titania particles were analyzed by X-ray diffractometry, and it was found that they consisted of rutile titanium oxide in which anatase titanium oxide was mixed. The crystallite diameter and average particle diameter of the particles are listed in Table 1.

Subsequently, a 10% by weight dispersion of the obtained titania particles was prepared and mixed with the above peroxotitanic acid solution. Hydroxypropylcellulose as a film formation auxiliary was added thereto in an amount of 30% by weight based on the titanium contents, in terms of $TiO_2$, of the mixture. Thus, a coating liquid for forming a semiconductor film was obtained.

Thereafter, this coating liquid was applied onto a transparent glass plate covered with an electrode layer of fluoride-doped tin oxide on the side of the electrode layer, and then the coating film was air-dried and irradiated with 6000 mJ/cm$^2$ ultraviolet light by means of a low pressure mercury lamp. Thus, the peroxotitanic acid was decomposed and the coating film was hardened. The coating film was heated at 300° C. for 30 min to thereby carry out hydroxypropylcellulose decomposition and annealing. Thus, a metal oxide semiconductor film was formed.

With respect to the formed metal oxide semiconductor film, the film thickness and the pore volume and average pore diameter measured by the nitrogen adsorption technique are listed in Table 1.

Adsorption of Photosensitizer

An adsorption of photosensitizer was performed in the same manner as in Example 1. The photosensitizer adsorption amount of the obtained metal oxide semiconductor film is listed in Table 1.

Preparation of Photoelectric Cell

A photoelectric cell was prepared in the same manner as in Example 1, and the Voc, Joc, FF and η thereof were measured.

The results are given in Table 1.

TABLE 1

| | Titanium oxide colloid particles | | | Semiconductor film | | | | Photoelectric cell | | | |
|---|---|---|---|---|---|---|---|---|---|---|---|
| | crystal form | diam. of crystallite (nm) | av. particle diam. (nm) | thickness of film (μm) | pore vol. (nm) | av. pore diam. (nm) | Adsorption amt. of photo-sensitizer (μg/cm$^2$) | Voc (V) | Joc (mA/cm$^2$) | FF | η (%) |
| Example 1 | anatase | 30 | 40 | 12 | 0.6 | 18 | 200 | 0.71 | 1.47 | 0.72 | 7.5 |
| Example 2 | anatase | 30 | 40 | 12 | 0.6 | 18 | 230 | 0.73 | 1.45 | 0.73 | 7.7 |
| Example 3 | anatase | 13 | 15 | 9 | 0.5 | 10 | 150 | 0.64 | 1.48 | 0.70 | 6.6 |
| Comp. Ex. 1 | amorphous | — | 4 | 7 | 0.3 | 6 | 160 | 0.55 | 1.40 | 0.40 | 1.8 |
| Comp. Ex. 2 | rutile *1 | 5 | 45 | 12 | 0.6 | 28 | 110 | 0.60 | 1.60 | 0.42 | 2.0 |

*1 partly containing a minute amount of anatase.

Example 4

Preparation of Coating Liquid 5 g of titanium hydride was suspended in 1 lit. of pure water, 400 g of a hydrogen peroxide solution of 5% by weight concentration was added to the suspension over a period of 30 min, and heated to 80° C. to effect dissolution. Thus, a solution of peroxotitanic acid was obtained. 90% by volume was divided from the whole amount of the solution, and its pH was adjusted to 9 by adding concentrated aqueous ammonia. The resultant mixture was placed in an autoclave and subjected to a hydrothermal treatment at 250° C. for 5 hr under saturated vapor pressure. Thus, titania colloid particles were obtained. The obtained titania colloid particles were analyzed by X-ray diffractometry, and it was found that they consisted of highly crystalline anatase titanium oxide. The average particle diameter of the titania colloid particles is listed in Table 2.

Subsequently, the obtained titania colloid particles were concentrated to a concentration of 10% by weight and mixed with the peroxotitanic acid solution. Hydroxypropylcellulose as a film formation auxiliary was added to the mixture in an amount of 30% by weight based on the titanium contents, in terms on $TiO_2$, of the mixture. Thus, a coating liquid for forming a metal oxide semiconductor layer was obtained.

Formation of Electrode

A 5 $\mu$m thick film of fluoride-doped tin oxide was formed on one side of a transparent glass plate by means of magnet sputtering apparatus (HSR-521A manufactured by Shimadzu Corporation) with the use of a target of fluoride-doped tin oxide under conditions such that RE power: 500 W, Ar gas: 10 sccm, pressure: 0.04 torr, time: 200 min, and plate temperature: 250° C. Subsequently, resist (OFPR-800 produced by Tokyo Ohka Kogyo Co., Ltd.) was applied onto the film of fluoride-doped tin oxide, and 2 $\mu$m-pitch line & space patterning was performed. Thereafter, etching was carried out by means of reactive ion etching RIE apparatus (DEM451T manufactured by Anelva Corporation) under conditions such that RF power: 500 W and mixed gas of $BCl_3$ (40 sccm) and Ar gas (10 sccm): 10 Pa. The resist was removed by ashing. Thus, there were formed a 0.5 $\mu$m thick transparent electrode layer and 4.5 $\mu$m high transparent conductive protrusions.

A 0.5 $\mu$m thick layer of fluoride-doped tin oxide was formed on one side of another transparent glass plate by means of the same magnet sputtering apparatus (HSR-521A) with the use of a target of fluoride-doped tin oxide under conditions such that RF power: 500 W, Ar gas: 10 sccm, pressure: 0.04 torr and time: 20 min. This layer was covered with platinum, thereby forming an electrode layer.

Thereafter, the above prepared coating liquid for forming a metal oxide semiconductor layer was applied onto the conductive protrusions and transparent electrode layer of fluoride-doped tin oxide, air dried and irradiated with 6000 $mJ/cm^2$ ultraviolet light by means of a low pressure mercury lamp. Thus, the peroxotitanic acid was decomposed and the layer was hardened. The layer was heated at 300° C. for 30 min to thereby carry out hydroxypropylcellulose decomposition and annealing. Thus, a titanium oxide semiconductor layer having a flat metal oxide semiconductor layer surface was formed.

With respect to the formed titanium oxide semiconductor layer, the layer thickness and the pore volume and average pore diameter measured by the nitrogen adsorption technique are listed in Table 2.

Adsorption of Photosensitizer

A ruthenium complex of cis-($SCN^-$)-bis (2,2'-bipyridyl-4,4'-dicarboxylato) ruthenium (II) as a photosensitizer was dissolved in ethanol in a concentration of $3 \times 10^{-4}$ mol/lit. The thus obtained photosensitizer solution was applied onto the titanium oxide semiconductor layer by the use of 100 rpm spinner, and dried. These application and drying operations were repeated five times. The photosensitizer adsorption amount, per $cm^2$ of specific surface area of the titanium oxide semiconductor layer, of the obtained titanium oxide semiconductor layer is listed in Table 2.

First, acetonitrile and ethylene carbonate were mixed together in a volume ratio of 1:4 to thereby obtain a solvent. Tetrapropylammonium iodide and iodine were dissolved in respective concentrations of 0.46 and 0.06 mol/lit. in the solvent to thereby obtain an electrolyte solution.

The above obtained transparent glass plate provided with electrode layer and conductive protrusions, as one electrode, and the above obtained transparent glass plate provided with electrode layer, as a counter electrode, were arranged so that the one electrode and the counter electrode were opposite to each other. The sides thereof were sealed with a resin, and the above electrolyte solution was charged so as to lie between the two electrodes. These electrodes were electrically connected to each other by a lead. Thus, photoelectric cell was obtained.

The obtained photoelectric cell was irradiated with light of 100 $W/m^2$ intensity by means of a solar simulator, and the Voc, Joc, FF and η thereof were measured.

The results are given in Table 2.

Example 5

The coating liquid for forming a metal oxide semiconductor layer, prepared in Example 4, was diluted with water so that the concentration thereof became ⅓, thereby obtaining the desired coating liquid for forming a metal oxide semiconductor layer (titania colloid particles prepared in Example 4 were contained in a concentration of 3.3% by weight, and hydroxypropylcellulose was contained in an amount of 10% by weight based on the titanium contents, in terms of $TiO_2$, of the liquid).

The thus obtained coating liquid for forming a metal oxide semiconductor layer was applied onto conductive protrusions and electrode layer composed of fluoride-doped tin oxide as described in Example 4 and rapidly dried. These operations were repeated six times. As a result, a titanium oxide semiconductor layer having a portion of the electrolyte infiltrated in the metal oxide semiconductor layer as described in Example 4 was formed.

Thereafter, the titanium oxide semiconductor layer was irradiated with 6000 $mJ/cm^2$ ultraviolet light by means of a low pressure mercury lamp. Thus, the peroxotitanic acid was decomposed and the titanium oxide semiconductor layer was hardened. Further, the titanium oxide semiconductor layer was heated at 300° C. for 30 min to thereby carry out hydroxypropylcellulose decomposition and annealing. Thus, a titanium oxide semiconductor layer having a flat metal oxide semiconductor layer surface was formed.

With respect to the formed titanium oxide semiconductor layer, the layer thickness and the pore volume and average pore diameter measured by the nitrogen adsorption technique are listed in Table 2.

Adsorption of Photosensitizer

An adsorption of photosensitizer on the titanium oxide layer was performed in the same manner as in Example 4.

The adsorption amount of photosensitizer is listed in Table 2.

Preparation of Photoelectric Cell

A photoelectric cell was prepared in the same manner as in Example 4, and the Voc, Joc, FF and η thereof were measured. The results are given in Table 2.

Example 6

Preparation of Particles Having Core-Shell Structure

A solution consisting of a mixture of 7.6 g of tetraethoxysilane and 100 g of ethanol was added once to a solution consisting of a mixture of 200 g of ethanol, 25 g of pure water and 60 g of aqueous ammonia of 29% by weight concentration. Thus, a dispersion of spherical silica particles having an average particle diameter of 0.2 $\mu$m was obtained. The obtained dispersion was concentrated to a silica concentration of 10% by weight by means of a rotary evaporator, thereby obtaining a silica particle dispersion (core particles).

5.5 g of titanium hydride was suspended in 1 lit. of pure water, 400 g of a hydrogen peroxide solution of 5% by weight concentration was added to the suspension over a period of 30 min, and heated to 80° C. to effect dissolution. Thus, a solution of peroxotitanic acid was obtained.

The previously prepared silica particle dispersion was heated to 90° C., and the peroxotitanic acid solution was added thereto over a period of 100 hr. Thus, there was obtained a dispersion of metal oxide particles consisting of a core of silica and a shell of titanium oxide. The obtained metal oxide particles were analyzed by X-ray diffractometry, and it was found that the shell consisted of anatase titanium oxide. The average particle diameter of the metal oxide particles is listed in Table 2.

Preparation of Photoelectric Cell

A 0.5 $\mu$m thick electrode layer of fluoride-doped tin oxide was formed on one side of a transparent glass plate 5 by means of magnet sputtering apparatus (HSR-521A manufactured by Shimadizu Corporation) with the use of a target of fluoride-doped tin oxide under conditions such that RF power: 500 W, Ar gas: 10 sccm, pressure: 0.04 torr, and time: 20 min.

A 0.5 $\mu$m thick layer of fluoride-doped tin oxide was formed on one side of another transparent glass plate by means of magnet sputtering apparatus (HSR-521A manufactured by Shimadzu Corporation) with the use of a target of fluoride-doped tin oxide under conditions such that RF power: 500 W, Ar gas: 10 sccm, pressure: 0.04 torr and time: 20 min. This layer was covered with platinum, thereby forming an electrode layer.

Negative-type photoresist (OMR-83 produced by Tokyo Ohka Kogyo Co., Ltd.) was applied onto the electrode layer 1 by 500 rpm spin coating, thereby forming a 6 $\mu$m thick resist film. Aligner exposure and subsequent development of the photoresist were carried out, and 6 $\mu$m-pitch line & space patterning was performed.

Thereafter, the transparent glass plate furnished with the patterned electrode layer was immersed in a dispersion of metal oxide particles. Using a platinum electrode as a counter electrode, a positive voltage was applied to the transparent glass plate. Thus, inter-resist deposition of metal oxide particles was effected. A separately prepared peroxotitanic acid was applied onto the layer of metal oxide particles by spin coating in an oxide weight ratio of 0.15 to the metal oxide particles, air dried, and irradiated with 6000 mJ/cm$^2$ ultraviolet light by means of a low pressure mercury lamp. Thus, the peroxotitanic acid was decomposed and the metal oxide semiconductor layer was hardened.

After the hardening, the resist was removed by O$^2$-ashing. Subsequently, a dispersion of indium colloid particles (ARS-22A with a particle diameter of 0.07 $\mu$m and a concentration of 2.5% by weight, produced by Catalysts & Chemicals Industries Co., Ltd.) was applied by spin coating so that the portions freed of the resist were packed with indium colloid particles to the same height as that of the metal oxide particle layer. Thus, conductive protrusions were formed.

The peroxotitanic acid solution was mixed with a metal oxide particle dispersion of 10% concentration obtained in the same manner as mentioned above in an oxide weight ratio of 0.15 to the metal oxide particles. Hydroxypropylcellulose as a film formation auxiliary was added to the mixture in an amount of 30% by weight based on the weight of metal oxide contained in the mixture. Thus, a coating liquid for forming a metal oxide semiconductor layer was obtained. This coating liquid was applied onto the metal oxide particle layer and the conductive protrusions composed of indium colloid particles, air dried once more, and irradiated with 6000 mJ/cm$^2$ ultraviolet light by means of a low pressure mercury lamp. Thus, peroxotitanic acid decomposition and hardening were effected. Further, heating was performed at 300° C. for 30 min to thereby carry out hydroxypropylcellulose decomposition and annealing. Thus, a titanium oxide semiconductor layer having a flat metal oxide semiconductor layer surface was formed.

With respect to the formed titanium oxide semiconductor layer, the layer thickness and the pore volume and average pore diameter measured by the nitrogen adsorption technique are listed in Table 2.

Adsorption of Photosensitizer

An adsorption of photosensitizer on the metal oxide semiconductor layer was performed in the same manner as in Example 4. The adsorption amount of photosensitizer is listed in Table 2.

Preparation of Photoelectric Cell

A photoelectric cell was prepared in the same manner as in Example 1, and the Voc, Joc, FF and $\eta$ thereof were measured.

The results are given in Table 2.

TABLE 2

| | Titanium oxide colloid particles | | | Conductive protrusions | | | |
|---|---|---|---|---|---|---|---|
| | crystal form | diam. of crstallite (nm) | av. particle diam. (nm) | configuration | height ($\mu$m) | width ($\mu$m) | interval ($\mu$m) |
| Example 4 | anatase | 30 | 35 | Cuboid structure | 4.5 | 2 | 2 |
| Example 5 | anatase | 30 | 35 | Cuboid structure | 4.5 | 2 | 2 |
| Example 6 | anatase *2 | 13 | 300 | Cuboid structure | 6 | 6 | 6 |

TABLE 2-continued

| | Semiconductor layer | | | | | Photoelectric cell | | | |
|---|---|---|---|---|---|---|---|---|---|
| | thickness of layer per se (μm) | thickness of semiconductor layer on conductive protrusion or electrode layer (μm) | pore vol. (nm) | av. pore diam. (nm) | adsorption amt. of photosensitizer (μg/cm$^2$) | Voc (V) | Joc (mA/cm$^2$) | FF | η (%) |
| Example 4 | 11.5 | 7–11.5 | 0.6 | 18 | 200 | 0.63 | 1.67 | 0.72 | 7.6 |
| Example 5 | 8.5–14.5 | 8–10 | 0.6 | 18 | 200 | 0.64 | 1.75 | 0.74 | 8.3 |
| Example 6 | 9 | 3–9 | 0.4 | 120 | 180 | 0.68 | 1.81 | 0.70 | 8.6 |

*2 comprising silica particles as cores.

What is claimed is:

1. A photoelectric cell comprising:
    a first insulating base having on its surface a first electrode layer, said first electrode layer having on its surface a metal oxide semiconductor layer on which a photosensitizer is adsorbed;
    a second insulating base having on its surface a second electrode layer, said first electrode layer and said second electrode layer arranged opposite to each other; and
    an electrolyte sealed between the metal oxide semiconductor layer and the second electrode layer,
    wherein:
        conductive protrusions jutting from the surface of the first electrode layer exist, said metal oxide semiconductor layer formed so as to cover the conductive protrusions and the first electrode layer, and
        at least one of said first insulating base having an electrode layer and said second insulating base having an electrode layer is transparent.

2. The photoelectric cell as claimed in claim 1, wherein the metal oxide semiconductor layer is formed along a contour of the conductive protrusions.

3. The photoelectric cell as claimed in claim 1, wherein the metal oxide semiconductor layer comprises spherical particles of at least one of metal oxides selected from the group consisting of titanium oxide, lanthanum oxide, zirconium oxide, niobium oxide, tungsten oxide, strontium oxide, zinc oxide, tin oxide and indium oxide.

4. The photoelectric cell as claimed in claim 3, wherein the spherical particles have an average particle diameter ranging from 5 to 600 nm.

5. The photoelectric cell as claimed in claim 4, wherein the spherical particles are composed of anatase titanium oxide.

6. The photoelectric cell as claimed in claim 4, wherein the spherical particles are those having a core-shell structure comprising a core particle of 0.1 to 500 nm in average particle diameter having its surface covered with a shell.

7. The photoelectric cell as claimed in claim 6, wherein the shell of the spherical particles of the core-shell structure is composed of anatase titanium oxide.

8. The photoelectric cell as claimed in claim 5, wherein the anatase titanium oxide is one obtained by subjecting peroxotitanic acid to heating and aging.

9. The photoelectric cell as claimed in claim 2, wherein the metal oxide semiconductor layer comprises spherical particles of at least one of metal oxides selected from the group consisting of titanium oxide, lanthanum oxide, zirconium oxide, niobium oxide, tungsten oxide, strontium oxide, zinc oxide, tin oxide and indium oxide.

10. The photoelectric cell as claimed in claim 6, wherein the anatase titanium oxide is one obtained by subjecting peroxotitanic acid to heating and aging.

11. The photoelectric cell as claimed in claim 1, wherein the metal oxide semiconductor layer contains a titanium oxide binder.

12. The photoelectric cell as claimed in claim 1, wherein the metal oxide semiconductor layer is one obtained by implanting ions of at least one gas selected from the group consisting of $O_2$, $N_2$, $H_2$ and inert gases of Group 0 of the periodic table and thereafter annealing.

13. The photoelectric cell as claimed in claim 1, wherein the metal oxide semiconductor layer has a pore volume of 0.05 to 0.8 ml/g and an average pore diameter of 2 to 250 nm.

14. A process for producing a metal oxide semiconductor film for use in a photoelectric cell, comprising applying a coating liquid comprised of peroxotitanic acid, anatase titanium oxide particles and a dispersion medium to obtain a coating film and curing the coating film, wherein the coating film is cured by irradiating the coating film with ultraviolet light irradiation, subsequently subjecting the coating film to implantation of ions of at least one gas selected from the group consisting of $O_2$, $N_2$, $H_2$ and inert gases of Group 0 of the periodic table and thereafter annealing.

* * * * *

UNITED STATES PATENT AND TRADEMARK OFFICE
CERTIFICATE OF CORRECTION

PATENT NO. : 6,538,194 B1
DATED : March 25, 2003
INVENTOR(S) : Koyanagi et al.

It is certified that error appears in the above-identified patent and that said Letters Patent is hereby corrected as shown below:

Title page,
Item [56], References Cited, FOREIGN PATENT DOCUMENTS, first reference, "EP 693800" should read -- EP 692800 --; third reference, JP 6-511113, "8/1994" should read -- 12/1994 --; and fourth reference JP 8-015097, "1/1996" should read -- 2/1996 --.

Column 2,
Line 49, "electron, movement" should read -- electron movement --
(delete comma)

Column 5,
Line 52, "efficiency. may" should read -- efficiency may -- (delete period)

Column 21,
Line 15, "RE power" should read -- RF power --.

Column 22,
Line 7, "Thus, photoelectric" should read -- Thus, a photoelectric --.

Signed and Sealed this

Second Day of September, 2003

JAMES E. ROGAN
*Director of the United States Patent and Trademark Office*